US008459842B2

(12) United States Patent
Kito et al.

(10) Patent No.: US 8,459,842 B2
(45) Date of Patent: Jun. 11, 2013

(54) LIGHT SOURCE DEVICE WITH MICROWAVE POWER SOURCE AND PROJECTION TYPE DISPLAY APPARATUS HAVING THE SAME

(75) Inventors: Satoshi Kito, Chino (JP); Junichi Suzuki, Chino (JP); Norio Imaoka, Takamori (JP)

(73) Assignee: Seiko Epson Corporation (JP)

( * ) Notice: Subject to any disclaimer, the term of this patent is extended or adjusted under 35 U.S.C. 154(b) by 244 days.

(21) Appl. No.: 12/958,636

(22) Filed: Dec. 2, 2010

(65) Prior Publication Data

US 2011/0204809 A1 Aug. 25, 2011

(30) Foreign Application Priority Data

Feb. 23, 2010 (JP) ................................. 2010-036942

(51) Int. Cl.

| | |
|---|---|
| ***F21V 7/09*** | (2006.01) |
| ***F21V 23/00*** | (2006.01) |
| ***H01J 1/50*** | (2006.01) |
| ***G03B 21/28*** | (2006.01) |

(52) U.S. Cl.

USPC ................. 362/296.07; 362/217.07; 362/221; 362/296.05; 313/161; 353/98

(58) Field of Classification Search

USPC .................... 362/296.01, 84, 217.05–217.07, 362/221, 296.04, 296.05, 296.07, 297, 304, 305; 313/231.31, 231.41, 231.51, 231.61, 313/231.7, 231.71, 153–162, 231.01; 315/39, 315/248

See application file for complete search history.

(56) References Cited

U.S. PATENT DOCUMENTS

| | | | | |
|---|---|---|---|---|
| 4,498,029 | A * | 2/1985 | Yoshizawa et al. | 315/39 |
| 4,990,789 | A * | 2/1991 | Uesaki | 250/504 R |
| 5,113,121 | A * | 5/1992 | Lapatovich et al. | 315/248 |
| 5,803,593 | A * | 9/1998 | Siminovitch et al. | 362/304 |
| 5,834,904 | A * | 11/1998 | Waymouth | 315/248 |
| 6,249,078 | B1 * | 6/2001 | Mimasu | 313/161 |
| 6,505,948 | B2 * | 1/2003 | Cekic et al. | 362/84 |
| 6,628,079 | B2 * | 9/2003 | Golkowski et al. | 315/39.51 |
| 6,696,802 | B1 * | 2/2004 | Lezcano et al. | 315/248 |
| 7,802,890 | B2 | 9/2010 | Takada et al. | |
| 2010/0097808 | A1 * | 4/2010 | Jurik | 362/296.01 |
| 2011/0085147 | A1 * | 4/2011 | Suzuki et al. | 353/98 |

FOREIGN PATENT DOCUMENTS

| | | |
|---|---|---|
| JP | 2008-192392 | 8/2008 |
| JP | 2010-107620 | 5/2010 |

* cited by examiner

*Primary Examiner* — Alan Cariaso

(74) *Attorney, Agent, or Firm* — Harness, Dickey & Pierce, P.L.C.

(57) ABSTRACT

A light source device includes: a microwave power source which generates microwaves; a central conductor which radiates the microwaves; and a light emitter which emits light by receiving the microwaves, wherein the central conductor and the light emitter are spaced from each other.

5 Claims, 5 Drawing Sheets

LIGHT SOURCE DEVICE WITH MICROWAVE POWER SOURCE AND PROJECTION TYPE DISPLAY APPARATUS HAVING THE SAME

BACKGROUND

1. Technical Field

The present invention relates to a light source device including a light emitter which emits light by using radiation of microwaves, and a projection type display apparatus containing the light source device.

2. Related Art

As disclosed in JP-A-2008-192392, for example, a light source device of a type currently used includes a microwave generating unit which generates microwaves, a central conductor provided on the microwave generating unit to radiate the microwaves (antenna according to JP-A-2008-192392), a light emitter (discharge lamp) connected with the central conductor to emit lights by power supply produced by the microwaves, a reflector which reflects the lights received from the light emitter in predetermined directions, a chamber formed integrally with the reflector to reflect the microwaves, and a light source case which blocks leakage of the microwaves to the outside. According to the light source device having this structure, the radiation of the microwaves reflected by the chamber and converged on the light emitter allows the light emitter to efficiently emit light. When this light source device is included in a projector as a projection type display apparatus, the projector becomes a high-luminance type apparatus capable of achieving high efficiency of using light.

According to the technology currently used in this field which connects the light emitter with the central conductor, the posture, position and others of the disposed light emitter are almost fixed, and thus adjustment or the like of the light emitter is difficult. Moreover, the necessity of equipping the light source case covering the light emitter and the reflector for blocking microwave leakage to the outside increases the number of components.

SUMMARY

An advantage of some aspects of the invention is to provide a technology capable of solving at least a part of the problems described above and the invention can be embodied as the following application examples or forms.

Application Example 1

Alight source device according to this application example of the invention includes: a microwave power source which generates microwaves; a central conductor which radiates the microwaves; and a light emitter which emits light by receiving the microwaves. The central conductor and the light emitter are spaced from each other.

According to this light source device, the light emitter can emit light by using power supply produced by microwaves generated by the microwave power source and radiated from the central conductor. Moreover, the light emitter is disposed such that the end or other portion of the light emitter is not connected with the central conductor directly or indirectly via another component but spaced from the central conductor. In this case, the light emitter disposed away from the central conductor can be easily positioned in various directions with respect to the central conductor such as in parallel, perpendicularly, and obliquely. Thus, the light emitter can be located with high flexibility. That is, the light emitter of the light source device can be freely and easily positioned in such a location as to efficiently receive microwaves and obtain sufficient power supply effect. Accordingly, the light emitter can receive sufficient power supply and achieve efficient light emission.

Application Example 2

In the light source device of the above application example, it is preferable that the light emitter contains a sealing portion into which a light emitting component allowed to emit light by the microwaves is sealed, and at least one conductor.

According to this structure, the conductor is a component equipped to concentrate the microwaves radiated from the central conductor for efficient power supply, and thus generates a local intensive electric field at the end of the conductor. This intensive electric field generated on the conductor excites the light emitting component contained in the sealing portion and allows the light emitter to emit light more intensively. That is, the light emitter having the conductor can efficiently emit light by concentration of the microwaves. While the light emitter is only required to have at least one conductor, it is more preferable that the plural conductors are equipped in balance for the sealing portion. When the light emitter is disposed such that the conductor extends in the same direction as the amplitude direction of the microwaves, for example, the light emitter can receive the microwaves more efficiently for light emission. Therefore, in the structure in which the central conductor and the light emitter are spaced from each other, the light emitter can be easily disposed in various positions including the condition and position described in this application example.

Application Example 3

In the light source device of the above application example, it is preferable that the conductor of the light emitter is disposed outside the sealing portion.

According to this structure, the conductor included in the light emitter is disposed outside the sealing portion and not inserted into the sealing portion. In this case, deterioration of the conductor can be reduced by preventing reaction of the conductor with the light emitting component or the like, for example. Thus, the conductor can be used for a long term. That is, the life of the light emitter can increase. Accordingly, the replacement interval of the light emitter included in the light source device can be prolonged, and thus the troublesome work and the economic burden for the replacement can be reduced.

Application Example 4

It is preferable that the light source device of the above application example further includes: a reflector which accommodates the light emitter, has an opening at one end, has at least apart made of conductive material, and reflects light received from the light emitter toward the opening. In this case, at least the one conductor has electric conduction with the reflector.

According to this structure, the reflector of the light source device reflects the light received from the light emitter to increase the efficiency of using light, and releases the light through the opening. The reflector having a part made of conductive material capable of blocking and reflecting microwaves has a function of preventing microwave leakage to the outside and increasing the power supply effect to the light emitter as well as the function of reflecting light. Thus, the necessity of providing other blocking components such as a light source case for preventing microwave leakage to the outside can be eliminated. Moreover, according to the light source device having the structure in which the conductor and the reflector have electric conduction, electromagnetic waves generated at the time of light emission of the light emitter by using microwaves can be guided to a ground. Thus, electromagnetic wave leakage to the outside can be more effectively avoided.

Application Example 5

It is preferable that the light source device of the above application example further includes an optical component which converges or deflects light received from the light emitter on the optical axis of the light. In this case, the optical component is disposed at the opening.

According to this structure which includes the optical component constituted by various types of optical lenses or the like, the efficiency of using light can be increased by collimating, converging, or deflecting light, or reducing the light guide distance between the light emitter and the optical component, for example. Thus, the light source device including the optical component can control the emitted light, and increase the degree of freedom in the optical design.

Application Example 6

A projection type display apparatus according to this application example of the invention includes a light source device which contains: a microwave power source which generates microwaves; a central conductor which radiates the microwaves; and a light emitter which emits light by receiving the microwaves. The central conductor and the light emitter are spaced from each other.

According to this projection type display apparatus, the light emitter of the light source device mounted on the projection type display apparatus can emit light by using the power supply produced by microwaves generated by the microwave power source and radiated from the central conductor. Moreover, the light emitter is disposed such that the end or other portion of the light emitter is not connected with the central conductor directly or indirectly via another component but spaced from the central conductor. In this case, the light emitter disposed away from the central conductor can be easily positioned in various directions with respect to the central conductor such as in parallel, perpendicularly, and obliquely. Thus, the light emitter can be located with high flexibility. That is, the light emitter of the light source device can be freely and easily positioned in such a location as to efficiently receive microwaves and obtain sufficient power supply effect. Accordingly, the light emitter can receive sufficient power supply and achieve efficient light emission. Thus, the projection type display apparatus including the light source device having this light emitter can project a high-luminance image by the efficient light emission of the light emitter.

BRIEF DESCRIPTION OF THE DRAWINGS

The invention will be described with reference to the accompanying drawings, wherein like numbers reference like elements.

DESCRIPTION OF EXEMPLARY EMBODIMENTS

A light source device and a projection type display apparatus according to exemplary embodiments of the invention are hereinafter described with reference to the accompanying drawings. In the respective embodiments, a light source device including a discharge lamp as a light emitter which emits light by power supply produced by microwaves, and a projector as a projection type display apparatus containing the light source device are discussed as examples.

First Embodiment

Figure 1:
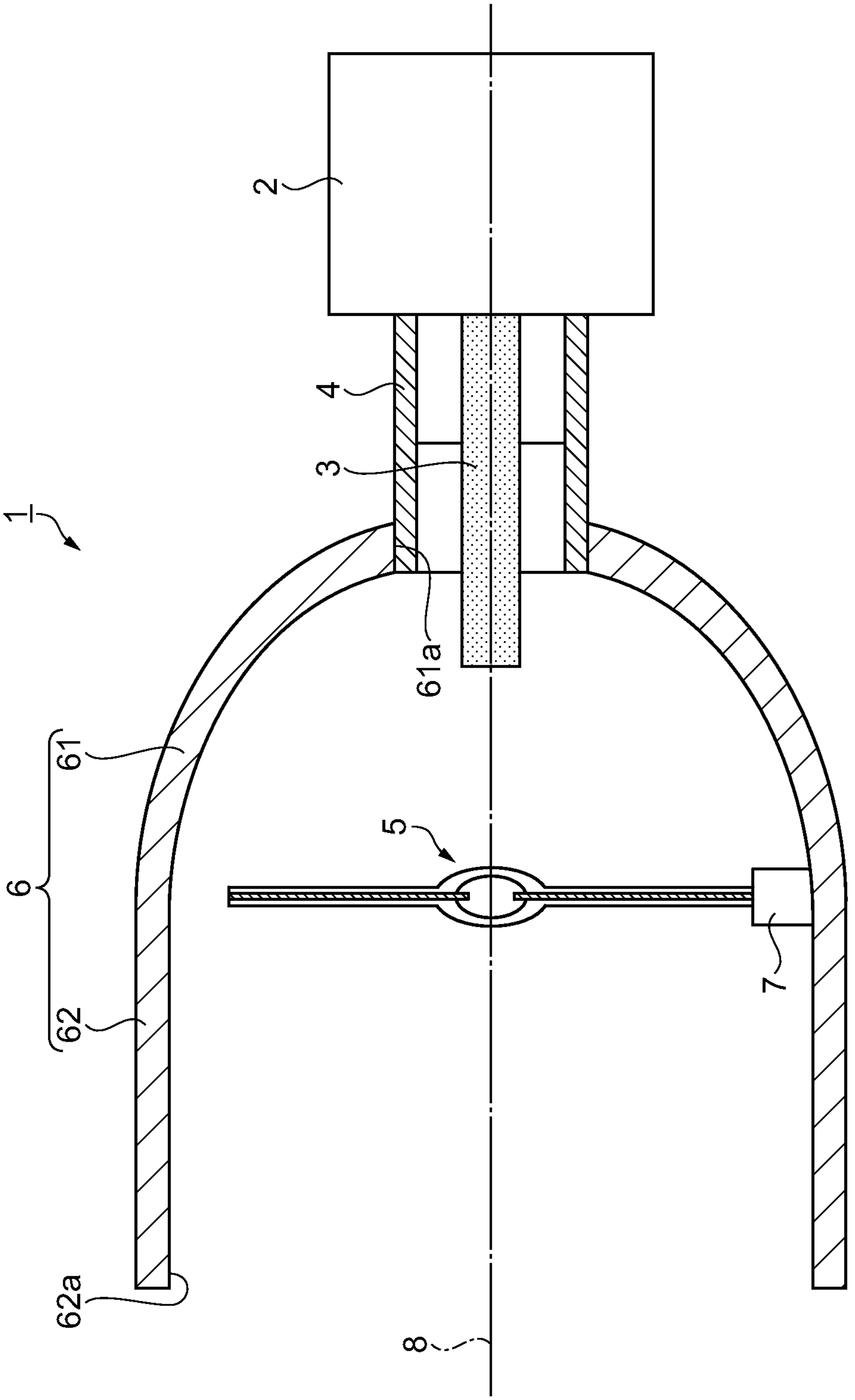
FIG. 1 is a cross-sectional view illustrating the structure of a light source device according to a first embodiment.

FIG. 1 is a cross-sectional view illustrating the structure of a light source device according to a first embodiment. As illustrated in FIG. 1, a light source device 1 includes a microwave power source 2 which generates microwaves, a central conductor 3 extended from the interior of the microwave power source 2 to radiate the microwaves generated by the microwave power source 2, a coaxial pipe 4 which accommodates the central conductor 3 as an inside conductor, a discharge lamp (light emitter) 5 disposed on the side opposite to the microwave power source 2 with respect to the central conductor 3 to emit light by power supply produced by the microwaves radiated from the central conductor 3, a reflector 6 which has an opening (aperture) 62*a* at one end to reflect lights received from the discharge lamp 5 disposed inside the reflector 6 toward the opening 62*a*, and a holding member 7 which holds the discharge lamp 5 on the reflector 6. The microwave power source 2, the central conductor 3, and the discharge lamp 5 are sequentially disposed along an optical axis 8 corresponding to the traveling direction of lights guided to the outside.

In this embodiment, both the coaxial pipe 4 and the central conductor 3 accommodated in the coaxial pipe 4 are made of copper (Cu). An insulation member made of fluororesin is provided between the coaxial pipe 4 and the central conductor 3 so as to prevent short-circuiting between these and to position the coaxial pipe 4 at a uniform distance from the central conductor 3. The central conductor 3 is cylindrical and extends in the direction of the optical axis 8 from the interior of the microwave power source 2. The tip of the extended central conductor 3 is opposed to the discharge lamp 5 and radiates microwaves generated from the microwave power source 2.

The microwaves employed for the light source device 1 are high-frequency waves in so-called TEM (transverse electro magnetic) mode which have no electric field component and no magnetic field component in the propagation direction of the waves. Thus, the loss of the radiation from the central conductor 3 to the discharge lamp 5 is small, allowing efficient radiation to be provided. The microwaves used in this embodiment have a frequency of 2.45 GHz and a wavelength $\lambda$ of 12.2 cm.

Figure 2A:
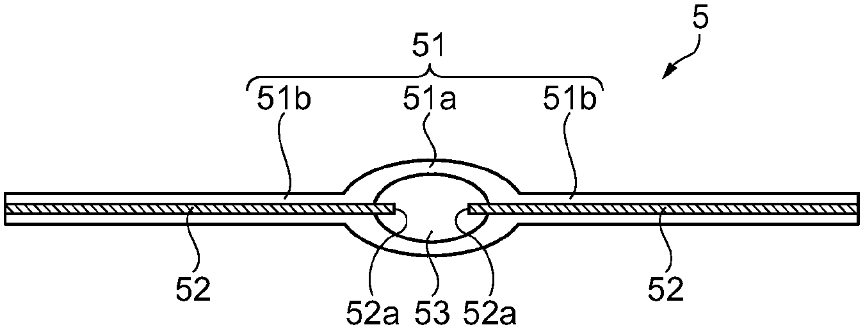
FIG. 2A is a cross-sectional view of the structure of a discharge lamp according to the first embodiment.

The discharge lamp 5 disposed opposed to the central conductor 3 is now explained. FIG. 2A is a cross-sectional view illustrating the structure of the discharge lamp 5. As can be seen from FIG. 2A, the discharge lamp 5 includes a transparent arc tube 51 and conductors 52. The arc tube 51 has a sealing portion 51*a* and a pair of hollow shaft portions 51*b* both made of quartz glass. The sealing portion 51*a* contains light emitting substances 53 sealed thereinto and allowed to emit light by microwaves, and the hollow shaft portions 51*b* extend toward both sides of the sealing portion 51*a*. Each of the conductors 52 is disposed within the hollow portion of the corresponding hollow shaft portion 51*b* and has a tip electrode 52*a* as a tip inserted into the sealing portion 51*a* and disposed opposed to the other tip electrode 52*a*. The longitudinal direction of the discharge lamp 5 is defined by the arc tube 51, and the hollow shaft portions 51*b* are linearly extended from both sides of the sealing portion 51*a* with the sealing portion 51*a* located at the center. The inside of the sealing portion 51*a* containing the light emitting substances 53, and the hollow portions of the respective hollow shaft portions 51*b* are both sealed. In this embodiment, mercury and rare gas of argon are sealed into the sealing portion 51*a* as the light emitting substances 53.

The conductors 52 are made of tungsten (W) as material having a small thermal expansion coefficient and a high melting point. The conductors 52 are components equipped for concentration of the electric field components of the microwaves radiated from the central conductor 3. When the electric field components of the microwaves are concentrated on the tip electrodes 52*a*, the light emission efficiency of mercury and argon as the light emitting substrates 53 within the sealing portion 51*a* can be increased. The discharge lamp 5 having this structure emits light from the sealing portion 51*a* as a so-called point light source.

The discharge lamp 5 is supported by the holding member 7 (FIG. 1) in such a condition as to be insulated from the reflector 6 (FIG. 1). The position of the supported discharge lamp 5 is determined in such a direction that the longitudinal direction of the discharge lamp 5 crosses the extending direction of the central conductor 3 at right angles, that is, the longitudinal direction of the discharge lamp 5 crosses the optical axis 8 at right angles. The discharge lamp 5 held in this condition can locate the conductors 52 in the same direction as the amplitude direction of the microwaves. Thus, the microwaves can be efficiently received by the conductors 52, allowing the power supply to be efficiently received. Moreover, the sealing portion 51*a* of the discharge lamp 5 is not directly connected with the central conductor 3 but is disposed at the position defined by the holding member 7 and the hollow shaft portions 51*b* with a space from the central conductor 3, in which position perpendicular to the optical axis 8 the sealing portion 51*a* is opposed to the central conductor 3. When the discharge lamp 5 is located away from the central conductor 3, the positions of the sealing portion 51*a* and the conductors 52 can be easily and freely determined. Thus, the microwaves can be more efficiently received.

Returning to FIG. 1, the light source device 1 has the reflector 6 provided in such a manner as to surround the discharge lamp 5. The reflector 6 has a substantially hemispherical curved portion 61 which has a hole 61*a* into which the coaxial pipe 4 is inserted, and a cylindrical portion 62 extending in the cylindrical shape from the opening side of the substantially hemispherical shape of the curved portion 61. The reflector 6 is fixed to the coaxial pipe 4 via the hole 61*a* of the curved portion 61, and has the opening 62*a* formed on the cylindrical portion 62 on the side opposite to the curved portion 61 such that lights emitted from the discharge lamp 5 can be released through the opening 62*a* to the outside.

The reflector 6 is made of aluminum (Al). The curved portion 61 has a parabolic surface in such a shape as to optically convert lights into collimated light or form a focus. When the sealing portion 51*a* of the discharge lamp 5 is disposed at the position of the focus of the parabolic surface, the lights emitted from the sealing portion 51*a* can be reflected by the parabolic surface and guided toward the opening 62*a* as collimated lights. The curved portion 61 has a mirror finish surface on the side facing the discharge lamp 5 to increase the reflectance of the surface for reflecting lights. By this method, the optical loss in reflection can be reduced, and thus the lights emitted from the discharge lamp 5 can be efficiently reflected.

The reflector 6 made of aluminum (Al) does not easily deform nor lower its reflectance even under a high temperature condition produced by light emission from the discharge lamp 5. Thus, the reflector 6 can maintain the reflection of the lights in a stable manner. Moreover, the reflector 6 has a function of efficiently diffusing heat generated from the discharge lamp 5 by utilizing the high thermal conductivity of aluminum (Al). Furthermore, the reflector 6 can reflect or block microwaves by the characteristics of the material of aluminum (Al). Thus, the reflector 6 can prevent leakage of microwaves to the outside other than that through the opening 62*a* of the light source device 1, and can also more effectively supply the energy of microwaves for the light emission of the discharge lamp 5 by the function of reflecting microwaves.

Figure 2B:
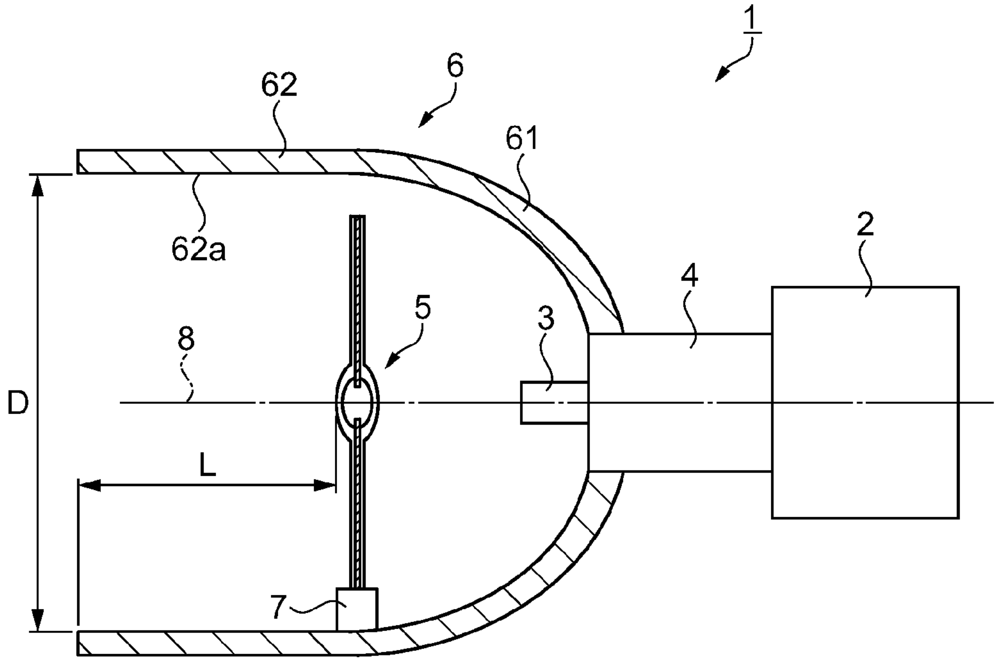
FIG. 2B is a cross-sectional view showing the setting of a cylindrical portion of the light source device.

In addition, the reflector 6 has a function of reducing leakage of microwaves from the opening 62*a* by utilizing the characteristics of microwaves that they cannot easily pass through the cylindrical shape, as well as the function of blocking microwaves based on the conductive characteristics of the material of aluminum (Al). FIG. 2B is a cross-sectional view showing the setting of the cylindrical portion of the light source device. As can be seen from FIG. 2B, the cylindrical portion 62 has a shape defined by an inside diameter D of the cylindrical shape and a distance L between the end of the discharge lamp 5 in the direction of the optical axis 8 to the opening 62*a*.

According to the cylindrical portion 62 having this structure, the relationship between the inside diameter D and the wavelength λ of the microwaves is determined such that the microwaves theoretically have a node of waves at the opening 62*a* of the reflector 6 and resonate thereat when $D=\lambda/2$. In this case, most part of the microwaves are reflected and remain within the reflector 6. When $D<\lambda/2$, the microwaves have no resonating part at the opening 62*a* of the reflector 6. In this case, most part of the microwaves cannot go outside. Thus, when the relationship is set at $D\leqq\lambda/2$, it is considered that leakage of the microwaves from the light source device 1 can be prevented.

The leakage of the microwaves from the opening 62*a* of the cylindrical portion 62 can be experimentally calculated based on the relationship between the distance L and the inside diameter D on the assumption of $D\leqq\lambda/2$, and the experimental results are disclosed by the present inventors. According to the disclosure of the experiment executed while changing the value L/D, the effect of attenuating microwaves increases as the value L/D becomes larger. That is, leakage of the microwaves decreases. For example, the attenuation effect of 50 dB is obtained when the value L/D is set at approximately 3.6. In the range of $L/D\geqq0.8$, the microwave leakage attenuation effect of 20 dB or larger can be produced. According to the light source device 1, the amount of leakage of the microwaves lies within the specified standard when the attenuation effect of at least 20 dB is produced. Under this condition, prevention of so-called unnecessary radiation has been confirmed. Accordingly, it is concluded that the relationships of D≦λ/2 and L/D≧0.8 are only required for obtaining the microwave leakage attenuation effect of 20 dB or larger.

The chief advantages offered by the light source device 1 according to the first embodiment are listed below.

(1) According to the light source device 1, the discharge lamp 5 is supported on the reflector 6 via the holding member 7 at a position spaced from the central conductor 3, and thus can be freely positioned. In this case, the discharge lamp 5 is easily disposed such that the conductors 52 can be located in the direction perpendicular to the extending direction of the central conductor 3. Accordingly, the discharge lamp 5 of the light source device 1 can efficiently receive microwaves and obtain sufficient power supply effect, and thus can achieve efficient light emission.

(2) The discharge lamp 5 is positioned in such a condition that the conductors 52 extend in the same direction as the amplitude direction of microwaves and thus receive microwaves more efficiently. Therefore, the discharge lamp 5 can produce intensive light emission. The discharge lamp 5 in this position can be easily disposed in the arrangement that the central conductor 3 and the discharge lamp 5 are located away from each other.

(3) The reflector 6 made of aluminum (Al) can prevent leakage of microwaves to the outside. Moreover, the reflector made of aluminum (Al) which has preferable thermal conductivity can rapidly diffuse heat generated from the discharge lamp 5, and thus can contribute to prevention of excessive heating of the light source device 1.

(4) According to the light source device 1, the discharge lamp 5 emits light by using power supply produced by microwaves. Thus, the light source device 1 can more rapidly emit high-luminance light at the time of the start of power supply.

Second Embodiment

Figure 3:
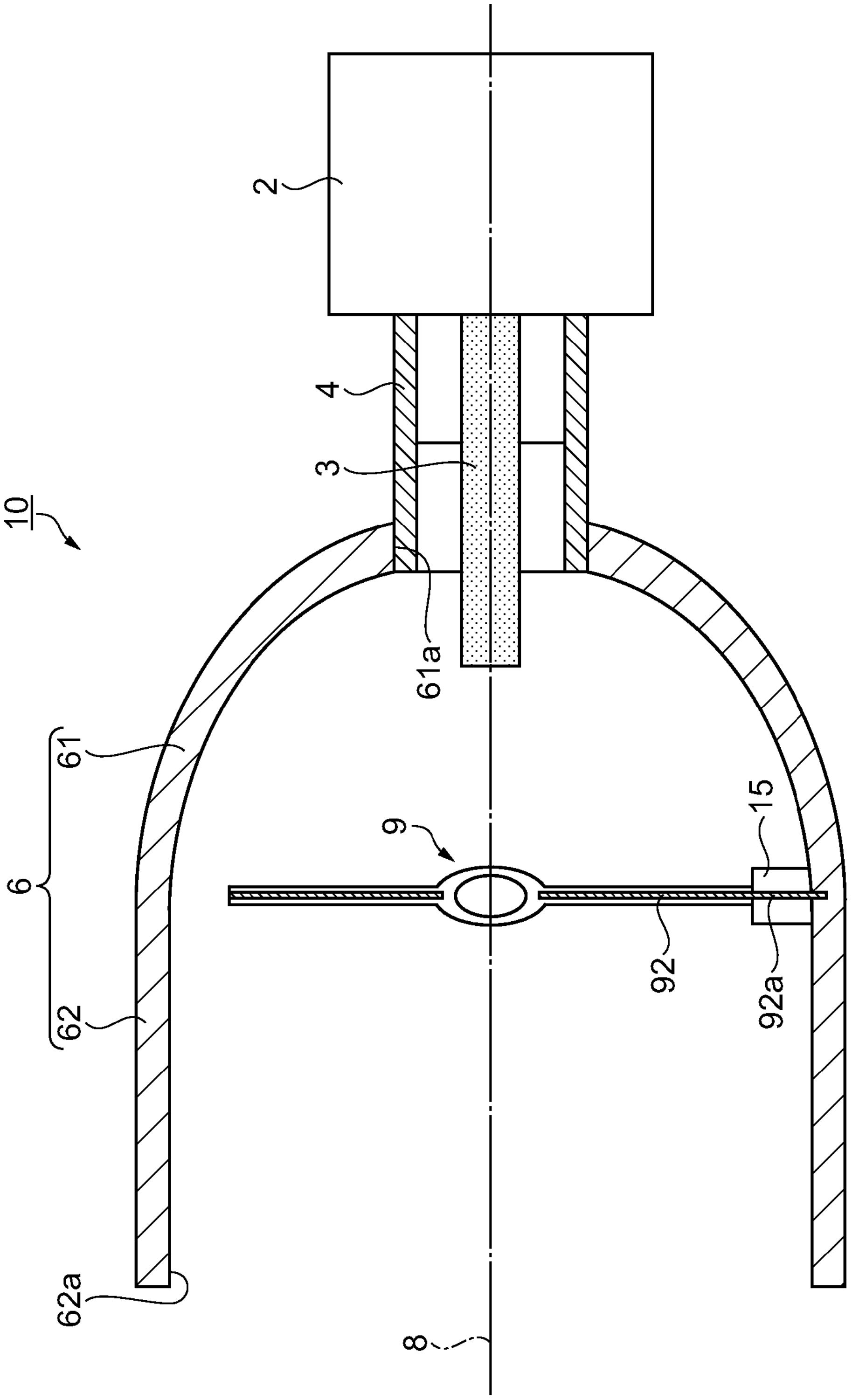
FIG. 3 is a cross-sectional view illustrating the structure of a light source device according to a second embodiment.
Figure 4:
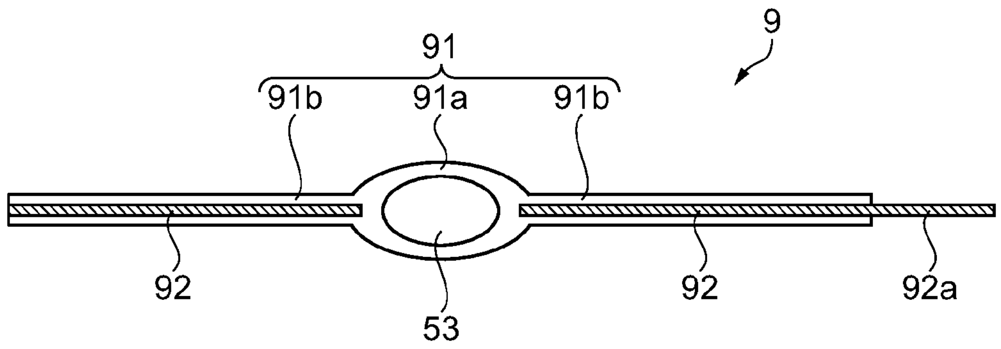
FIG. 4 is a cross-sectional view illustrating the structure of a discharge lamp according to the second embodiment.

A light source device according to a second embodiment as another example is now described. FIG. 3 is a cross-sectional view illustrating the structure of the light source device in the second embodiment. FIG. 4 is a cross-sectional view illustrating the structure of a discharge lamp in the second embodiment. A light source device 10 according to the second embodiment is different from the light source device 1 in the first embodiment only in the holding structure of a holding member 15 for supporting a discharge lamp 9 in FIG. 3 and the positioning structure for positioning conductors 92 on a sealing portion 91*a* in FIG. 4. Thus, components of the light source device 10 other than the discharge lamp 9 and the holding member 15 are similar to the corresponding components in the first embodiment, and the same reference numbers are given to the components shown in FIGS. 3 and 4 similar to the corresponding components in the first embodiment. According to the light source device 10, the discharge lamp 9 is disposed in the same position as that of the discharge lamp 5 in the first embodiment with respect to the reflector 6.

The discharge lamp 9 of the light source device 10 is initially explained. As illustrated in FIG. 4, the discharge lamp 9 includes a transparent arc tube 91 and conductors 92. The arc tube 91 has the sealing portion 91*a* and a pair of hollow shaft portions 91*b* both made of quartz glass. The sealing portion 91*a* contains the light emitting substances 53 sealed thereinto and allowed to emit light by microwaves, and the hollow shaft portions 91*b* extend toward both sides of the sealing portion 91*a*. Each of the conductors 92 is disposed within the hollow portion of the corresponding hollow shaft portion 91*b*. The ends of the conductors 92 on the sealing portion 91*a* side are not inserted into the sealing portion 91*a* but disposed outside the sealing portion 91*a*.

In this structure, one of the conductors 92 has a connecting portion 92*a* provided at one end on the side opposite to the sealing portion 91*a* and projecting from the hollow shaft portion 91*b*. The longitudinal direction of the discharge lamp 9 is defined by the arc tube 91, and the hollow shaft portions 91*b* are linearly extended from both sides of the sealing portion 91*a* with the sealing portion 91*a* located at the center. In this embodiment, mercury and rare gas of argon as the light emitting substances 53 are sealed into the sealing portion 91*a*.

The conductors 92 are made of tungsten (W) as material having a small thermal expansion coefficient and a high melting point. The conductors 92 are components equipped for concentration of the electric field components of microwaves radiated from the central conductor 3. When the electric field components of the microwaves are concentrated, the light emission efficiency of mercury and argon contained within the sealing portion 91*a* can be increased. Unlike the conductors 52 in the first embodiment, the ends of the conductors 92 do not directly contact the mercury and argon sealed into the sealing portion 91*a*. Even in this structure, the electric field components of the microwaves can be concentrated, and thus light emission substantially equivalent to that in the case of the conductors 52 in the first embodiment can be achieved. The discharge lamp 9 in this embodiment belongs to the type which emits light from the sealing portion 91*a* as a so-called point light source.

As illustrated in FIG. 3, the discharge lamp 9 is held on the reflector 6 via the holding member 15. The connecting portion 92*a* of the one conductor 92 is inserted into the holding member 15 to penetrate through the holding member 15. The connecting portion 92*a* penetrating through the holding member 15 has electric conduction with the reflector 6. By this electric conduction between the connecting portion 92*a* of the conductor 92 and the reflector 6, electromagnetic waves produced at the time of light emission from the mercury and argon in the sealing portion 91*a* by using microwaves can be captured and guided toward the reflector 6, thereby preventing leakage of the electromagnetic waves to the outside. Accordingly, even when the conductor 92 of the discharge lamp 9 has conduction with the reflector 6, the discharge lamp 9 can be easily positioned as long as the sealing portion 91*a* of the discharge lamp 9 is supported by the holding member 15 and the hollow shaft portion 91*b* and spaced from the central conductor 3.

The main advantages of the light source device 10 according to the second embodiment are listed below.

(1) According to the light source device 10, the conductors 92 included in the discharge lamp 9 are disposed outside the sealing portion 91*a* and not inserted into the sealing portion 91*a*. In this case, deterioration of the conductors 92 caused by the high temperature and reaction resulting from light emission of the mercury and argon as the light emitting component can be reduced, and thus long-term use of the conductors 92 is allowed. Accordingly, the life of the discharge lamp 9 increases.

(2) According to the light source device 10, the one conductor 92 has electric conduction with the reflector 6 via the connecting portion 92*a*. Thus, electromagnetic waves generated during light emission by microwaves can be guided to the reflector 6 functioning as a ground as well to effectively prevent leakage of electromagnetic waves to the outside.

Figure 5:
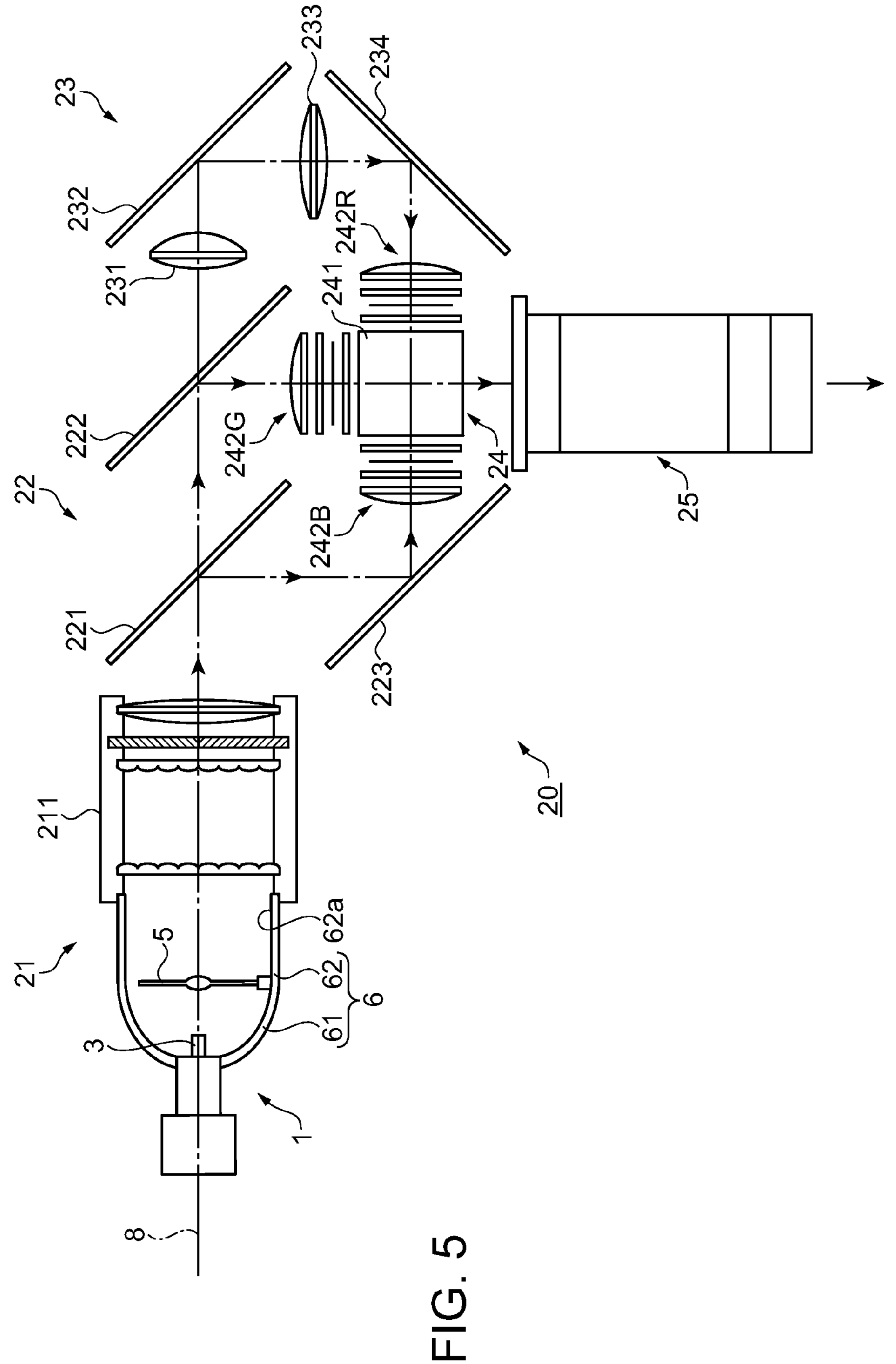
FIG. 5 schematically illustrates the structure of a projector including the light source device.

A projector as an example of a projection type display apparatus which includes the light source device 1 or the light source device 10 is now described. FIG. 5 schematically illustrates the structure of the projector including the light source device. As illustrated in FIG. 5, a projector 20 in this example uses the light source device 1, and includes an integrator illuminating unit 21, a color dividing unit 22, a relay optical unit 23, and a light modulating unit 24 which has three liquid crystal panel sections 242R, 242G, and 242B. The light modulating unit 24 is connected with a projecting unit 25. Each of the liquid crystal panel sections 242R, 242G, and 242B contains a liquid crystal panel, a polarizing filter and others.

The integrator illuminating unit 21 is an optical system which supplies lights generated from the light source device 1 to the three liquid crystal panel sections 242R, 242G, and 242B provided on the light modulating unit 24 for red, green and blue lights, respectively such that image forming areas of the liquid crystal panel sections 242R, 242G, and 242B can be illuminated by the lights almost uniformly. For providing this illumination, a lens group of an optical component 211 is equipped at the end of the light source device 1. The lens group of the optical component 211 includes a first lens array, a second lens array, a polarization converting element, and a stacking lens in this order from the light source device 1 side. As described above with reference to FIG. 1, the light source device 1 is constructed such that the discharge lamp 5 is spaced from the central conductor 3 and positioned perpendicularly to the optical axis 8 as the light emission direction.

The color dividing unit 22 includes two dichroic mirrors 221 and 222 and a reflection mirror 223, and has a function of dividing plural partial lights received from the integrator illuminating unit 21 into three colors lights in red, green, and blue. In this case, the dichroic mirror 221 of the color dividing unit 22 transmits the red component and the green component of the lights received from the integrator illuminating unit 21, and reflects the blue component. The blue light reflected by the dichroic mirror 221 is further reflected by the reflection mirror 223 and reaches the liquid crystal panel section 242B for blue light. The green light having passed through the dichroic mirror 221 is reflected by the dichroic mirror 222 and reaches the liquid crystal panel section 242G for green light. The red light having passed through the dichroic mirrors 221 and 222 travels toward the relay optical unit 23.

The relay optical unit 23 is an optical system which includes an entrance side lens 231, a reflection mirror 232, a relay lens 233, and a reflection mirror 234 in this order, and has a function of guiding the color light contained in the color lights divided by the color dividing unit 22 and having a long path to the liquid crystal panel section 242R. In this example, the relay optical unit 23 guides the red light.

The light modulating unit 24 disposed next is an optical system which forms optical images by modulating the respective color lights using the three liquid crystal panel sections 242R, 242G, and 242B according to image information, and produces a color image by combining the optical images formed by modulation of each color light by the function of a cross dichroic prism 241. The color image thus formed is expanded and projected by a projection lens contained in the projecting unit 25, and displayed as an image on a screen or the like.

The projector 20 including the light source device 1 provides the following advantages.

(1) According to the projector 20, the discharge lamp 5 of the light source device 1 can be freely positioned. Thus, the conductors 52 can be disposed in the direction perpendicular to the central conductor 3 with a space between the conductors 52 and the central conductor 3. In this arrangement, the discharge lamp 5 included in the light source device 1 of the projector 20 can efficiently receive microwaves and obtain sufficient power supply effect, thereby achieving efficient light emission. Accordingly, the projector 20 can project images having higher luminance.

(2) According to the projector 20, the discharge lamp 5 of the light source device 1 can start light emission more rapidly. Thus, the waiting time before image projection can be reduced.

The light source devices 1 and 10 and the projector 20 as the projection type display apparatus are not limited to the examples shown herein but may be modified in the manner described below, for example. Advantages similar to those of the embodiments can be offered by the following modified examples.

Modified Example 1

According to the light source device 1, each of the conductors 52 of the discharge lamp 5 has one end inserted into the sealing portion 51*a*, and is insulated from the reflector 6. However, one or both of the conductors 52 of the discharge lamp 5 may have conduction with the reflector 6. The conductor 52 of the discharge lamp 5 is not required to be provided on both sides of the sealing portion 51*a* but may be disposed only one side of the sealing portion 51*a* and insulated from the reflector 6. Alternatively, the conductor 52 provided only on one side may have conduction with the reflector 6. As in this example, the structure of the light source device 1 may have a wide variety of options selected according to the shape of the reflector 6, the light emitting substances 53 of the discharge lamp 5 and the like. Accordingly, the light source device 1 having the optimum structure can be produced.

Modified Example 2

According to the light source device 10, the end of each of the conductors 92 of the discharge lamp 9 is disposed outside the sealing portion 91*a*, and one of the conductors 92 has conduction with the reflector 6. However, the structure of the light source device 10 may have a variety of options similarly to the light source device 1 in the modified example 1.

Modified Example 3

The conductors 52 and 92 of the discharge lamps 5 and 9 included in the light source devices 1 and 10 may be eliminated to provide the discharge lamps 5 and 9 as lamps having no electrode. Even when the conductors 52 and 92 are not equipped, the light emitting substances 53 are allowed to emit low-luminance light by microwaves.

Modified Example 4

The conductors 52 and 92 of the discharge lamps 5 and 9 may be made of materials other than tungsten (W) as long as they have high melting points, such as molybdenum (Mo) and stainless steel alloy.

Modified Example 5

The microwaves generated by the microwave power source 2 in the light source devices 1 and 10 are high-frequency waves in TEM mode which have the frequency of 2.45 GHz and the wavelength $\lambda$ of 12.2 cm. However, microwaves having other frequencies and wavelengths may be used.

Modified Example 6

While the light emitting substances 53 sealed within the sealing portions 51*a* and 91*a* of the discharge lamps 5 and 9 are constituted by mercury and argon, metal halide such as sodium or rare gas such as neon, krypton, and xenon may be used.

Modified Example 7

The reflector 6 made of aluminum (Al) has a mirror finish surface on the curved portion 61 on the side facing the discharge lamp 5 to increase reflectance of the reflector 6 for reflecting lights. However, a dielectric multilayer film made of titanium oxide, silicon oxide or the like may be formed on the surface of the curved portion 61 on the side facing the discharge lamp 5 to reflect lights with a higher rate.

Modified Example 8

While the light source device 1 is incorporated in the projector 20, the light source device 10 which contains the conductors 92 of the discharge lamp 9 having a longer life may be used as the light source of the projector 20 in place of the light source device 1. In this case, the intervals of replacement of the discharge lamp 9 can be prolonged, and thus the troublesome work for replacement can be reduced. Accordingly, the economical advantages of the projector 20 can improve.

Modified Example 9

While the projector 20 includes the liquid crystal panels as the light modulating elements, light modulating elements such as micromirror array devices other than the liquid crystal panels may be used. As such, the light source devices 1 and 10 may be mounted on a projector including various types of light modulating elements, and can provide advantages of luminance increase of the projector, prevention of microwave leakage and the like in any applications.

Accordingly, the discharge lamps 5 and 9 included in the light source devices 1 and 10 for emitting light by using microwaves can be freely positioned at locations away from the central conductor 3 for efficient power supply. Thus, the light source devices 1 and 10 can achieve high-luminance light emission. Moreover, the light source devices 1 and 10 can prevent microwave leakage to the outside. Therefore, the light source devices 1 and 10 can be used as a light source for exposure or cleaning, an illumination light source for a large-sized advertising plate or a guiding plate, a head light of an automobile, and in other various applications as well as the light source of the projector 20.

The entire disclosure of Japanese Patent Application No. 2010-036942, filed Feb. 23, 2010 is expressly incorporated by reference herein.

What is claimed is:

1. A light source device comprising:

a microwave power source which generates microwaves;

a central microwave conductor which radiates the microwaves with a wavelength $\lambda$;

a light emitter which emits light by receiving the microwaves, the light emitter including a sealing part and at least one light conductor;

a light emitting component adapted to emit the light, the light emitting component being sealed within the sealing part;

a U-shaped reflector that reflects the light, the reflector having a curved part and a cylindrical part extending from the curved part, the curved part having a hole therein, the cylindrical part defining an opening opposite the curved part, at least a portion of the reflector being made of a conductive material, wherein the central microwave conductor and the light emitter are spaced apart from each other, the central microwave conductor is inserted in the hole of the reflector, the opening is at an end of the cylindrical part and has an internal diameter D, the light emitter is fixed to an internal surface of the cylindrical part of the reflector and has a distance L between the opening and an edge of the sealing part, and $D \leqq \lambda/2$ and $L/D \geqq 0.8$.

2. The light source device according to claim 1, wherein the light conductor of the light emitter is disposed outside the sealing part.

3. The light source device according to claim 1, wherein the reflector directs the light toward the opening and the light conductor is electrically connected to the reflector.

4. The light source device according to claim 1, further comprising:

an optical component which converges or deflects the light received from the light emitter on the optical axis of the light, wherein the optical component is disposed at the opening.

5. A projection type display apparatus comprising:

a light source device including:

a microwave power source which generates microwaves;

a central microwave conductor which radiates the microwaves with a wavelength $\lambda$;

a light emitter which emits light by receiving the microwaves, the light emitter including a sealing part and at least one light conductor;

a light emitting component adapted to emit the light, the light emitting component being sealed within the sealing part;

a U-shaped reflector that reflects the light, the reflector having a curved part and a cylindrical part extending from the curved part, the curved part having a hole therein, the cylindrical part defining an opening opposite the curved part, at least a portion of the reflector being made of a conductive material, wherein the central microwave conductor and the light emitter are spaced apart from each other, the central microwave conductor is inserted in the hole of the reflector, the opening is at an end of the cylindrical part and has an internal diameter D, the light emitter is fixed to an internal surface of the cylindrical part of the reflector and has a distance L between the opening and an edge of the sealing part, and $D \leqq \lambda/2$ and $L/D \geqq 0.8$, an optical component that converges or deflects the light from the light emitter and that is provided next to the opening;

a light modulation unit that receives the light and that forms an image by modulating each color of the light; and a projection unit that projects the image.

* * * * *